United States Patent
Deiss

(10) Patent No.: US 8,318,280 B2
(45) Date of Patent: *Nov. 27, 2012

(54) SEALING TAPE OF SOFT FOAM AND METHOD FOR ITS PRODUCTION

(75) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 689 days.

This patent is subject to a terminal disclaimer.

(21) Appl. No.: 12/448,381

(22) PCT Filed: Nov. 30, 2007

(86) PCT No.: PCT/EP2007/010433
§ 371 (c)(1),
(2), (4) Date: Jun. 18, 2009

(87) PCT Pub. No.: WO2008/074390
PCT Pub. Date: Jun. 26, 2008

(65) Prior Publication Data
US 2010/0009118 A1 Jan. 14, 2010

(30) Foreign Application Priority Data
Dec. 18, 2006 (EP) ..................... 06026192

(51) Int. Cl.
*B32B 9/00* (2006.01)
*B32B 3/26* (2006.01)
*B32B 7/12* (2006.01)
*E04C 1/00* (2006.01)
*B65H 81/00* (2006.01)
*B29C 70/34* (2006.01)

(52) U.S. Cl. .................. 428/40.1; 428/158; 428/304.4; 428/317.1; 428/317.3; 52/309.1; 52/309.4; 52/309.5; 156/184; 156/191; 156/192; 156/193; 156/250; 156/289

(58) Field of Classification Search .................. 428/40.1, 428/906, 41.7, 41.8, 158, 304.4, 317.1, 317.3; 52/309.1, 309.4, 309.5, 309.7; 156/60, 184, 156/191–193, 250, 289, 323
See application file for complete search history.

(56) References Cited

U.S. PATENT DOCUMENTS

| | | | |
|---|---|---|---|
| 3,713,263 A | 1/1973 | Mullen | |
| 4,181,711 A | 1/1980 | Ohashi et al. | |
| 4,204,373 A | 5/1980 | Davidson | |
| 4,344,265 A * | 8/1982 | Davidson | 52/745.15 |
| 4,356,676 A | 11/1982 | Hauptman | |

(Continued)

FOREIGN PATENT DOCUMENTS
DE 17 84 467 11/1971
(Continued)

*Primary Examiner* — Patricia Nordmeyer
(74) *Attorney, Agent, or Firm* — Jansson Shupe & Munger Ltd.

(57) ABSTRACT

A compressed and re-expandable soft foam sealing tape, which is provided on one side with a self-adhesive layer covered by a cover film, and rolled up into a roll, is provided. A flexible film strip is inserted between the adhesive surface and the cover film at least along its edge on one side of the sealing tape roll and is adhered to the adhesive surface. The remaining film strip is folded over the sealing tape roll and inserted between the soft foam layer, to which the portion of the film strip has been adhered, and the cover film adhering to the adjacent soft foam layer.

18 Claims, 1 Drawing Sheet

U.S. PATENT DOCUMENTS

| | | | |
|---|---|---|---|
| 6,672,597 B1 * | 1/2004 | Irrgeher et al. | 277/650 |
| 2004/0157012 A1 * | 8/2004 | Miller et al. | 428/34.1 |

FOREIGN PATENT DOCUMENTS

| | | |
|---|---|---|
| DE | 24 57 322 | 6/1976 |
| DE | 41 23 647 | 12/1992 |
| DE | 43 07 528 | 9/1994 |
| DE | 196 41 415 | 4/1998 |
| DE | 297 15 660 | 7/1999 |
| DE | 199 44 611 | 3/2001 |
| DE | 10 2004 012 473 | 10/2005 |
| EP | 0 072 955 | 8/1982 |
| EP | 1131525 B1 | 9/2000 |
| WO | WO 98/45565 | 10/1998 |

* cited by examiner

SEALING TAPE OF SOFT FOAM AND METHOD FOR ITS PRODUCTION

FIELD

The present invention pertains to a sealing tape of soft foam.

BACKGROUND

Sealing tapes of soft and flexible foam material are used in the construction industry to provide a seal against drafts and driving rain. For household use by the end user, there are generally known foam tapes with a thickness of usually a few millimeters, which are provided on one side with a self-adhesive layer covered by a cover film and are wound up uncompressed into rolls. They are used between window or door panels and the window or door frames to seal leaky windows and doors. For this purpose, they are adhered to suitable points on the panel or frame.

In the professional building construction industry, sealing tapes, usually impregnated, of soft and flexible foam material are used between window and door frames and the masonry. These types of sealing tapes can be up to a few centimeters thick and are usually provided on one side with a self-adhesive layer, by means of which they can be adhered to the frame profile elements of windows and doors. So that a component which has been provided with the sealing tape can be installed more easily at the construction site, sealing tapes of this type are frequently impregnated with a material which delays the recovery of the foam material from its compressed state, i.e., the state in which it has been delivered on a roll, back to the expanded state.

To prevent the diffusion of vapor, it is necessary to use sealing tapes of the previously mentioned type which have been provided with a vapor barrier. A sealing tape of open-pored material which has been rolled up into a disk and which is used to seal joints or gaps against drafts and driving rain is known from DE 196 41 415 C2, in which at least one barrier layer is arranged inside the sealing tape in such a configuration that it and the adjacent open-pored areas form a row in the axial direction. The barrier layer therefore extends in the radial direction of the sealing tape roll.

To produce a sealing tape of the last-mentioned type, large sheets of barrier layer material are formed into laminated blocks by laminating and/or adhering layers of them to panels or to web material of open-pored raw foam. The laminated blocks are then cut at right angles to the large sheets of barrier layer lamination material and/or to the adhesive to obtain plates with barrier layers. The blocks are cut in such a way that, after the cutting operation, the barrier layers are parallel to one edge of the panel and extend perpendicularly through the panel. A panel of this type is then compressed and wound up into a roll in such a way that the barrier layers and the open-pored material form a row in the axial direction on the circumference of the roll. Finally, the roll is cut into disks between the individual barrier layers. This process is relatively complicated and demands a high degree of dimensional accuracy from the foam material during processing, because otherwise there is the danger of damage to the barrier layers when the roll is cut into disks.

A method by means of which plastic bodies of open-pored foam can be provided on their outside surfaces with a polyurethane coating by spraying is known from DE 24 57 322 A1. This method, however, demands special measures for the preparation of the foam. It is therefore not suitable for application to compressed foam bodies which are intended to expand again when put into use, because the coating applied in the compressed state would interfere with the expansion or possibly make any such expansion impossible. If only a thin coating were to be applied, i.e., thin enough to allow the foam to expand, there would be the danger that the coating would crack. For technical reasons, the application of the coating by spraying in the expanded state is uneconomical in the case of sealing tapes.

WO 98/45565 shows sealing tape with a removable film coating, which covers three sides of the sealing tape in the compressed state.

SUMMARY

It is an object of the present invention to provide an easy-to-produce sealing tape incorporating a film strip and also to provide a method for its production.

The invention provides a sealing tape with at least one lateral surface covered by a film strip. A self-adhesive layer is arranged on the bottom surface of the soft foam strip, to which layer at least one portion of the film strip is attached, wherein both edges of the film strip are arranged between adjacent turns within the roll.

A basic distinction can be made between sealing tapes of soft, flexible foam material which are delivered in the compressed state and those which are delivered in the uncompressed state. The present invention can be applied in principle to both types of tape.

In the case of sealing tapes delivered in the compressed state, at least one edge of the film strip is attached to the bottom surface of the foam strip, this bottom surface usually being the one used to adhere the sealing tape to the structural element to be sealed, such as a frame profile element of a window or door. The bottom surface of the foam strip is provided with a self-adhesive layer, which then also holds the film strip in place.

The film strip is wide enough to extend completely over the adjacent exposed lateral surface of the sealing tape even after the structural component has been installed, i.e., after the foam strip, which forms the main component of the sealing tape, has partially re-expanded. In one preferred embodiment, the film strip is wide enough such that it extends over one of the sides in the compressed state, over both lateral surfaces, and over the edge portions of the foam strip.

In one preferred embodiment, the film strip is a vapor barrier film, in which case the inventive sealing tape can take over the same function as the sealing tape described in DE 196 41 415 C2. In another preferred embodiment, the film strip, however, could also be a UV barrier film, which is intended to protect the foam material covered by it from the effects of UV rays. Films which are selected from an aesthetic standpoint, such as metallized or colored films, are also conceivable. Specifically, the invention can be realized with any type of film-like, flexible tape material, which is selected according to the individual requirements, including textile materials or even laminates with several layers.

One advantage of the present invention is that a completely mobile system is created, consisting of a soft, elastic foam strip and a film strip, wherein the film strip is attached to the foam strip in such a way that it can slide across the entire functional area of the sealing tape. When the soft foam strip expands as a result of its elastic recovery after installation of the structural element equipped with it, the reserve film strip material provided is available for movement along the lateral surface of the foam strip and is used up without the need for the film strip itself to stretch.

Accordingly, the sealing tape can be produced in the form of narrow sealing tape rolls, also called sealing tape disks because of their configuration and dimensions, without the need for special measures to prepare the foam material for the production of the sealing tape disks. The method includes providing such sealing tape disks with a flexible film, such as a vapor barrier film, in the form of a film web, after the disks have been produced.

In contrast to what is described in DE 196 41 415 C2, sealing tape disks are usually produced by taking a wide web of soft foam, which can be impregnated with an expansion-retarding agent, and covering it on one side with a cover film, such as silicone paper. Before the cover film is applied, a self-adhesive layer is applied to the foam material. The prepared foam web may be rolled up under mechanical pressure to reduce the thickness of the foam web and then held in that state. Such configuration may be achieved and maintained by adhering the end of the outermost sealing tape layer to the layer lying just beneath it with a strip of adhesive tape. The compressed or uncompressed foam roll thus formed is then cut into disks of predetermined width by a process such as sawing or a similar cutting process. The present invention makes identical use of such a cutting procedure.

In a first preferred embodiment of the method according to the invention, it is assumed that the soft foam material has not been compressed so tightly during the winding-up of the roll from which the sealing tape disks are cut that the foam material within the disk cannot be squeezed together any further in the radial direction. In the method now to be described, the bond between the self-adhesive layer and the cover film within the sealing tape disk is progressively released by mechanical means. Such mechanical means may include a plough-shaped shoe or the like, which is moved relative to the sealing tape disk. A flexible film strip, such as a vapor barrier film strip, is inserted into the gap thus formed and adhered to the self-adhesive layer exposed by the formation of the gap. As soon as the shoe has moved onward, the gap closes again by itself as a result of the recovery of the foam material.

The film strip projecting from the sealing tape disk has some remaining width, which preferably corresponds to the sum of the thickness of the foam layer in the compressed state and the width of the sealing tape disk. In the case of a sealing tape with these dimensions, the foam strip may not be allowed to expand by an amount equal to more than the width of the sealing tape after installation of the structural component to which it has been applied. Such construction avoids a situation where the film strip no longer completely covers the one lateral surface of the sealing tape. This film strip is now progressively folded over the sealing tape disk and pushed in between the foam layer to which the portion of the film strip in question is adhering. In addition, the cover film now adheres to the adjacent layer of foam, again, by way of example, with the help of a plough-shaped shoe. In another preferred embodiment, the remaining width of the film strip is increased to push these folds between the turns of the sealing tape disk. Such an increase in width is accomplished by folding the film strip onto the other side of the sealing tape disk or to create longitudinal folds in the film strip.

If, for example, the original height of the foam strip of the sealing tape is 30 mm and it has been compressed to a height of 4-5 mm in the roll, the manufacturer frequently limits its area of application to gaps, which are to be bridged by the sealing tape, of a certain width such as 15 mm. The reason for this is that, if the foam material were to be allowed to expand more than that, it would not rest tightly against the wall of the building.

The functional range of the sealing tape, which determines the width of the film strip to be selected, is therefore determined by the degree of compression of the foam material within the roll and the maximum recovery of the foam material after installation of the structural element to which the tape has been applied. The minimal thickness after compression of impregnated foam materials is currently about 10% of the original thickness. The recovery capacity after compression is sometimes not enough to allow the foam to return to its original thickness.

If the film strip is attached only along one edge to the soft foam strip, it is possible, if the width of the film strip is sufficient, to push the strip through all the way to the other side of the sealing tape disk. In this configuration, the film strip may wrap its other edge over onto the same side of the soft foam strip as that to which the first edge is attached. However, this other edge is not adhered to the foam strip but rather simply laid onto the adhesive-free side of the cover film.

It is also possible to attach the film strip over its entire width to the self-adhesive layer, to the extent present, thereby allowing the strip to project from both sides of the sealing tape disk. Thus, both projecting portions of the film strip can then be laid around the turn of the foam strip to which the longitudinal portion of the film strip in question is attached. So that the adhesive property of the sealing tape remains intact, it is desirable to provide the area of the film strip where it covers the adhesive layer with openings or holes large enough to make the adhesive layer accessible from the outside. Such exposure to ambient air is necessary to ensure that the cover film is held in place and to make it possible, after the cover film has been peeled off, for the sealing tape to be adhered by its self-adhesive property to the structural component to be sealed.

The finished disk of sealing tape is therefore covered on at least one side by a film strip, which winds around in spiral fashion in the same way as the foam material.

Preferably, the steps of attaching the film strip to the foam strip and subsequently inserting the film strip projecting from the sealing tape disk between the turns of the sealing tape are carried out in a single process.

In the case of uncompressed foam rolls, the method can be carried out in generally the same manner.

In the case of a second preferred embodiment of the method according to the invention, the sealing tape is rewound in a manner comparable to that of the rewinding of an audio tape. The sealing tape is therefore unwound from the sealing tape disk and immediately wound back up onto a second winding core. As the foam material of the sealing tape is already compressed, it is held in the compressed state in the interval between the unwinding and the rewinding, either by mechanical means or by means of an impregnation of the foam with a material which sufficiently delays its expansion. During this interval and before the tape is rewound, the cover film is separated over at least part of its width from the self-adhesive layer which it covers. Into the gap thus formed, a portion of the width of a film strip of the desired type is inserted and adhered, and the gap is closed again. Then the rest of the width of the film strip is folded over the foam strip before the sealing tape, which has been given its final form in this way, arrives at the newly forming disk-shaped roll. In the finished roll or disk of sealing tape treated in the inventive manner, therefore, film material is arranged between the cover film of the one turn and the foam material of the adjacent turn of the sealing tape. The width of the film strip is selected in the same way as that used in the first method described above.

When the method is carried out by rewinding the sealing tape from one roll to another, it is also possible to process an uncompressed sealing tape. Before it is rewound, this tape is compressed in conjunction with the method of providing it with the film strip. A disk of compressed sealing tape is thus obtained.

While the foam strip is being rewound from the one roll to the other, the self-adhesive layer can be applied to the foam strip either as a mass of self-adhesive or as a strip of double-sided adhesive tape, after which the previously mentioned cover film is applied. It is also possible to use a film strip provided with a self-adhesive layer on its outward-facing side, which is itself covered by a strip of cover film. In this case, the foam strip coming from the first roll does not need to be provided with a cover film.

To ensure the sufficiently reliable adhesion of the film strip to the foam material of the sealing tape, it is desirable to insert approximately 1-2 mm of the width of the film strip into the gap formed temporarily between the self-adhesive layer and the cover film during the finishing operation, and to attach this portion to the self-adhesive layer.

A first preferred embodiment of a device for providing a soft foam sealing tape of rectangular cross section with a film strip in the manner described above includes a rotary disk, upon which the sealing tape disk is laid. The device also includes means for holding the sealing tape disk down on the rotary disk in a position centered on the axis of rotation of said disk. At least one plough-shaped shoe is mounted through the rotary disk to a support, and includes a runoff edge and a rear side. Means for moving the support in a radial direction relative to the rotary disk and means for feeding the film strip to the shoe from the rear side thereof are also included. The device includes means for lowering the support to the rotary disk, and means for rotating the rotary disk in the direction pointing from the rear side of the shoe towards the runoff edge thereof.

When this device is in use, the film strip is fed from the rear under the shoe, which has the shape of a plough or cutting tool with a V-shaped cross section. With its sharp edge facing forward, the shoe is lowered onto the sealing tape disk and introduced to a depth of about 1-5 mm between the self-adhesive layer and the cover film covering the self-adhesive layer of this sealing tape layer. As a result of the V-shaped configuration of the shoe, a gap is thus formed, into which the shoe presses the film strip. The sealing tape disk is now rotated in the direction such that the film strip which has been attached by the shoe to the sealing tape is pulled past the working edge of the shoe and away from the shoe. The shoe now continues to advance along its track, following the turns of the sealing tape in a way similar to that of the needle of a traditional record player, following the turns of the sealing tape. The track can be followed from the outside in or from the inside out, depending on the direction in which the stealing strip is wound.

A second plough-shaped shoe is preferably mounted on the support which carries the first shoe, the second shoe being radially and rotationally offset from the first. The second shoe folds the film strip attached to the sealing tape by the first shoe over the sealing tape disk and immediately pushes it into the intermediate space between the already finished wound layer and the adjacent, not as yet finished wound layer. The second shoe may be mounted in such a way that it can be adjusted radially with respect to the first shoe, so that the device can be adapted for use with sealing tapes of different thicknesses.

If both sides of the foam strip are to be processed in this way, a corresponding second device is required. The sealing tape disk, finished on one side, is then turned onto the second device, so that the other side can then be processed.

In a second embodiment, the device has two winding stands, one of which, namely, the unwinding stand, has the purpose of receiving a sealing tape disk to be processed. The other stand, the wind-up stand, has the purpose of receiving the winding core, onto which the sealing tape finished in the inventive manner is wound up. The device also comprises associated means for slowing the first winding stand and for driving the second winding stand. Between the two winding stands, means with a shoe are provided, which is to be inserted between the cover film and the self-adhesive layer. The shoe is positioned such that it is located at least in an edge area of the foam material being rewound between the two winding stands. A third winding stand is also present, which is intended to hold the spool of film strip. Between the third winding stand and the shoe, guiding means are provided to guide the film strip from the third winding stand to the previously mentioned shoe. Means for folding the film strip over the exposed surfaces of the foam strip are provided between the shoe and the second winding stand.

If it is desired to process a sealing tape of foam material not impregnated with a recovery-retarding agent, mechanisms are present in the intermediate space between the first and second winding stands which are suitable for keeping the sealing tape in almost a completely compressed state, as it leaves the first winding stand. This is necessary to guarantee that the film strip can be folded over the exposed top surface of the foam material.

According to another preferred embodiment of the method, a wide, soft, elastic foam web is laminated on at least one side to a film web. The foam web thus produced is wound up into a roll and then cut into individual disks of a width corresponding to the height of a sealing tape in the uncompressed state. The foam disks thus produced are then unwound, and the foam strip is rotated 90° and wound up again under compression into a sealing disk. The lateral surface of the sealing tape which is covered by at least one piece of film forms a flat side of the sealing tape disk. Before the sealing tape is wound up again, one of the surfaces of the foam strip adjacent to the side covered by the film strip can be provided with a strip of self-adhesive covered by a cover film.

Smooth strips can be used as the film strips. It is also possible to use film strips which are provided with longitudinal folds at least over a portion of their width. This offers the advantage that, even in cases where the compressed soft foam strip re-expands to a very considerable extent after installation of the sealing tape, the overall width of the film strip will be sufficient to completely cover a lateral surface of the foam strip. The folds can, if desired, be provided with an adhesive which releases with a certain delay, as a result of which it becomes possible to delay the recovery of the foam material from the compressed state even if the foam material has not been impregnated with a recovery-delaying agent.

In another preferred embodiment, a film strip is used which forms a longitudinal pocket over a certain portion of its width. This pocket lays on one of the visible sides of the foam strip after the expansion of the sealing tape, and can be filled with a material with the desired properties such as an intumescent material.

BRIEF DESCRIPTION OF THE DRAWINGS

Cross sectional views of several exemplary embodiments of sealing tapes according to the invention are shown schematically in the drawings.

DETAILED DESCRIPTION

All of the drawings show a foam strip, an adhesive layer, the film strip or strips, and the cover film in a way which makes it appear that they are a certain distance apart from each other. This is to illustrate more clearly how these elements are positioned with respect to each other. It should therefore be emphasized that, in reality, the elements are resting right on top of each other; that is, they are pressed onto each other and are thus in mutual contact. It should also be emphasized that all the figures show cross sections of a sealing tape. FIGS. 1-7 and 8a show the state which is to be found when the sealing tape is wound up in the compressed state on a winding core.

Figure 1:
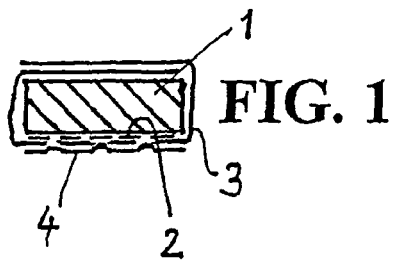
FIG. 1 shows a first embodiment with a film strip which is provided with holes and which otherwise adheres over its entire surface to the self-adhesive layer on the foam strip.

FIG. 1 depicts a foam strip 1, which is shown in the compressed state. In this state, it has a flat, rectangular cross section and is provided with a self-adhesive layer 2 on one side, which is to be referred to as the "bottom surface" here and in the case of all the following examples to be explained below. This self-adhesive layer 2 is shown in broken line. A film strip 3 is attached to the bottom surface of the foam strip 1 by means of self-adhesive layer 2. This film strip is considerably wider than foam strip 1. The side edges of the film strip 3 projecting beyond the width of foam strip 1 are folded around foam strip 1 and overlap onto each other on the top surface of foam strip 1. In the area adhering to self-adhesive layer 2, film strip 3 is provided with a plurality of openings or holes. In the area of the bottom surface of foam strip 1, film strip 3 is covered by a cover film 4. The openings or holes in film strip 3 are large enough that, by pressing cover film 4 down, it can be adhered to self-adhesive layer 2 accessible through the holes in film strip 3.

Figure 2:
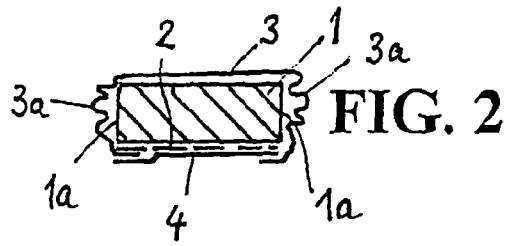
FIG. 2 shows a second embodiment with a film strip, one edge of which lies under the cover film, whereas the other edge lies on top of the cover film.

FIG. 2 shows an embodiment of the invention in which a foam strip 1, which is provided on one side with a self-adhesive layer 2, is surrounded by a film strip 3. One edge of film strip 3 is inserted between self-adhesive layer 2 and a cover film 4, which is adhering to self-adhesive layer 2. This edge of the film strip is thus being held in place by self-adhesive layer 2, whereas the other edge lies on top of cover film 4 and is held in place in the roll (not shown) between cover film 4 and foam strip 1 of the adjacent turn (not shown). In the area of the lateral surfaces 1a of foam strip 1, film strip 3 has reserve material for expansion in the form of loose folds 3a, which can also be realized by only a single fold or by a loose bulge of film strip 3. When foam strip 1 expands from the state shown in FIG. 2, film strip 3 can slide over lateral surface 1a on the right side of foam strip 1 in FIG. 2, thus allowing foam strip 1 to expand to a considerable degree overall without leaving lateral surface 1a on the left in FIG. 2 uncovered.

Figure 3:
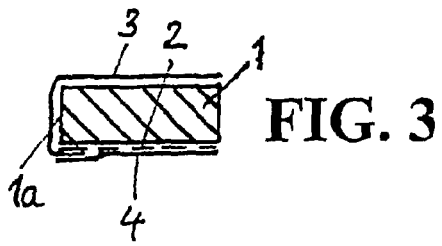
FIG. 3 shows a third embodiment with a film strip which covers only one side of the soft foam strip.

FIG. 3 shows a third embodiment of the invention, in which one edge of a film strip 3 is inserted at the bottom surface of a foam strip 1 between self-adhesive layer 2 located on the bottom surface of foam strip 1 and the edge of cover film 4 covering it. Film strip 3 is guided up along lateral surface 1a of foam strip 1 and folded down onto its top surface.

Figure 4:
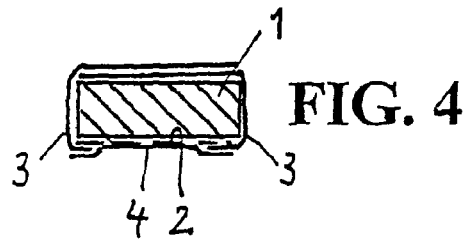
FIG. 4 shows a fourth embodiment with two film strips, which cover both sides of the soft foam strip.

FIG. 4 shows a modification of the embodiment according to FIG. 3, which differs from the latter in that, at the bottom surface of foam strip 1, two film strips 3 are adhered to self-adhesive layer 2, one on each side, both being covered by the edges of cover film 4. Two film strips 3 are wrapped around foam strip 1 and overlap each other on the top surface of the foam.

Figure 5:
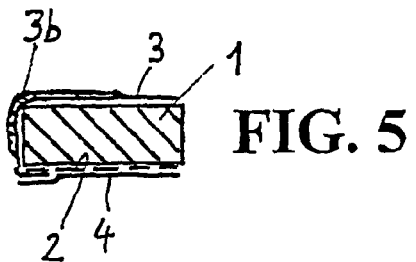
FIG. 5 shows a fifth embodiment with a film strip which comprises a longitudinal pocket.

FIG. 5 shows a second variant of the embodiment of FIG. 3. This differs from the embodiment according to FIG. 3 in that, in film strip 3, a longitudinal pocket 3b is formed, which can be filled with a material of predetermined properties such as an intumescent. Otherwise, this embodiment is the same as that of FIG. 3. It should be emphasized here that the embodiment according to FIG. 5 can also be modified in the manner shown on the basis of FIG. 4, according to which two film strips 3 are provided, one of which or possibly both of which can be equipped with pockets 3b according to FIG. 5.

Figure 6:
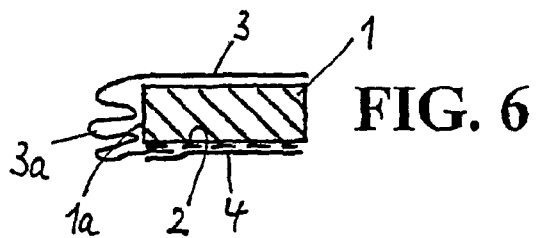
FIG. 6 shows a sixth embodiment with a film strip which has longitudinal folds.

FIG. 6 shows a third variant of the embodiment of FIG. 3. In this embodiment, film strip 3 forms a row of folds 3a on lateral surface 1a of foam strip 1, which allow foam strip 1 to expand to a greater height than in the case of the embodiment of FIG. 3 without the lateral surface 1a of film strip 3 losing its covering. This embodiment, too, can be designed symmetrically in the manner of the embodiment of FIG. 4. Folds 3a can also be arranged on the top surface of the sealing tape in a kind of loop (not shown in the drawing). In addition, the part of fold 3a which touches the top surface of the sealing tape can be attached (e.g., adhered) there either at specific locations such as small dots or over its entire surface, wherein the remaining part of fold 3a provides the expansion reserve and is released during the expansion of foam 1.

Figure 7:
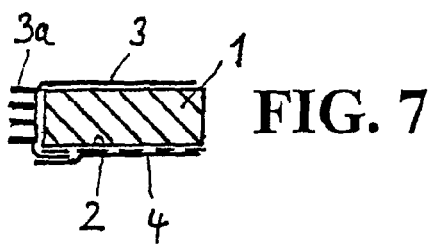
FIG. 7 shows a variant of FIG. 6, in which the folds of the film strip are filled with an adhesive which releases with a certain delay.

The embodiment of FIG. 7 is a variant of the embodiment of FIG. 6. It differs from the latter in that folds 3a are glued on the inside by an adhesive which releases only with a certain delay. This makes it possible for foam strip 1 to expand considerably but only at the rate determined by the applied adhesive.

Figures 8A, 8B, 8C:
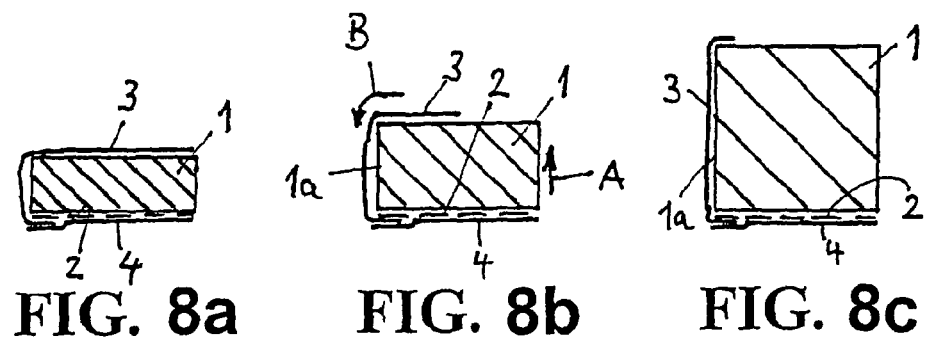
FIGS. 8a-8c show the process of the expansion of the compressed soft foam strip in the case of an inventive sealing tape of the embodiment according to FIG. 3.

FIGS. 8a-8c illustrates the manner in which sealing tape according to the present invention operates. An example, sealing tape of FIG. 3 is used to illustrate and explain the operation. FIG. 8a shows the state of the sealing tape on the roll, although the roll itself is not shown. The sealing tape is also in the state shown here immediately after it has been taken from the roll, provided that foam strip 1 has been impregnated with a recovery-delaying agent. Over the further course of time, due to the elastic recovery force intrinsic to the foam material, foam strip 1 expands in the direction of the arrow A. This has the result of film strip 3 sliding across the upper edge between lateral surface 1a covered by film strip 3 and the top surface of foam strip 1. This movement is shown in FIG. 8b by the arrow B. At the end of the allowed expansion of foam strip 1, film strip 3 has slid almost completely off the top surface of foam strip 1 but still covers the entire lateral surface 1a of foam strip 1. This is the state which is present, for example, after a structural frame element provided with the sealing tape has been installed in an opening in a building and has been sealed off by the sealing tape against the reveal of the opening. It should be pointed out, however, that cover film 4 has in this case been pulled off, because the sealing tape is adhered to the frame element in question by means of self-adhesive layer 2.

While the invention has been described and illustrated in conjunction with specific preferred embodiments, it will be evident that many alternatives, modifications, variations and combinations will be apparent to those skilled in the art. Any such changes may be made without departing from the spirit and scope of the invention. The described and illustrated embodiments are to be considered in all respects only as illustrative and not restrictive. These and all other similar modifications and changes are considered to be within the scope of the present invention.

The invention claimed is:

1. A sealing tape roll comprising:
   a soft foam strip of rectangular cross-section, which strip forms a roll having several turns, the soft foam strip having two outer lateral surfaces, a top surface, and a bottom surface;
   a self-adhesive layer arranged on the bottom surface of the soft foam strip;
   at least one film strip, which covers at least one of the lateral surfaces of the soft foam strip and comprises two longitudinal edges;
   wherein at least a portion of the film strip is attached to the self-adhesive layer; and
   wherein each of the two longitudinal edges of the film strip is arranged between adjacent turns of the soft foam strip inside the roll.

2. The sealing tape roll according to claim 1, wherein a cover film covers the bottom surface of the soft foam strip and the self-adhesive layer.

3. The sealing tape roll according to claim 1, wherein the film strip completely covers the self-adhesive layer, is folded up from the bottom surface of a first turn onto the top surface of the soft foam strip from two sides so that the film strip covers the two lateral surfaces of the soft foam strip and the two longitudinal edges of the film strip are inserted between the first turn and an adjacent turn.

4. The sealing tape roll according to claim 3, wherein the at least one portion of the film strip adhering to the self-adhesive layer is provided with a plurality of openings.

5. The sealing tape roll according to claim 1, wherein the film strip comprises a width which is at least equal to a width of the soft foam strip plus a height of the soft foam strip in a compressed state, and wherein the at least one portion of the film strip is inserted under a cover film on at least one side of the soft foam strip in an edge area thereof.

6. The sealing tape roll according to claim 5, wherein an area of the film strip not adhering to the self-adhesive layer covers a first lateral surface and the top surface of the soft foam strip.

7. The sealing tape roll according to claim 6, wherein the area of the film strip not adhering to the self-adhesive layer also covers a second lateral surface of the soft foam strip.

8. The sealing tape roll according to claim 7, wherein at least one of the longitudinal edges of the film strip is inserted between the cover film of a first turn and the top surface of an adjacent turn.

9. The sealing tape roll according to claim 1, wherein a portion of the film strip adjacent to one of the lateral surfaces of the soft foam strip is provided with a plurality of longitudinal folds.

10. The sealing tape roll according to claim 1, wherein the film strip comprises a fold, configured into a loop, on the top surface of the soft foam strip to serve as an expansion reserve.

11. The sealing tape roll according to claim 1, wherein an area of the film strip adjacent to one of the lateral surfaces of the soft foam strip is provided with a longitudinal pocket.

12. The sealing tape roll according to claim 11, wherein the pocket is filled with an intumescent material.

13. The sealing tape roll according to claim 1, wherein the soft foam strip is compressed within the roll in an elastically recoverable manner.

14. The sealing tape roll according to claim 13, wherein the folds are bonded with an adhesive which slowly releases and delays the expansion of the compressed soft foam strip.

15. A method for producing a sealing tape roll, comprising:
   applying a self-adhesive layer and a cover film to a bottom surface of a wide soft foam web;
   rolling up the soft foam web and securing a soft foam web roll thus formed;
   cutting the soft foam web roll into disk-shaped sealing tape rolls forming a soft foam strip of a determined width and rectangular cross-section;
   progressively mechanically releasing a connection between the self-adhesive layer and the cover film of each sealing tape roll over at least a portion of a width thereof thus forming a gap;
   inserting a portion of a flexible film strip into the gap, a width of the film strip corresponding at least to a sum of the width of the portion of the film strip arranged in the gap, a thickness of a layer of the soft foam strip in a compressed state, and at least a portion of a width of the sealing tape roll;
   fixing the film strip to the self-adhesive layer and closing the gap; and
   continuously folding an area of the film strip projecting from the sealing tape roll over the sealing tape roll, and inserting the film strip between a top surface of a first turn of the soft foam strip to which the film strip is fixed and an adjacent turn of the soft foam strip to cover at least a lateral surface of the soft foam strip.

16. The method according to claim 15, wherein an adhesive connection between the self-adhesive layer and the cover film is only progressively mechanically released on one side of the sealing tape and over a portion of a width thereof, and only one edge portion of the film strip is arranged inside the gap.

17. A method for producing a sealing tape roll, comprising:
   applying a self-adhesive layer and a cover film to a bottom surface of a wide soft foam web;
   rolling up the soft foam web and securing a soft foam web roll thus formed;
   cutting the soft foam web roll into disk-shaped sealing tape rolls of a predetermined width;
   unwinding a disk-shaped sealing tape roll thereby producing an unwound sealing tape of rectangular cross-section;
   progressively mechanically releasing the connection between the self-adhesive layer and the cover film of the unwound sealing tape over at least a portion of a width thereof thus forming a gap;
   inserting a portion of a flexible film strip into the gap, a width of the film strip corresponding at least to a sum of a width of the portion of the film strip arranged in the gap, a thickness of a layer of the soft foam strip in a compressed state, and at least a portion of a width of the unwound sealing tape;
   fixing the film strip to the self-adhesive layer over at least a portion of a width thereof and closing the gap;
   continuously folding an area of the film strip projecting from the sealing tape over the sealing tape to cover at least a lateral surface of the sealing tape; and winding up the unwound sealing tape into a compressed sealing tape roll.

18. The method according to claim 17, wherein an adhesive connection between the self-adhesive layer and the cover film is only progressively mechanically released on one side of the sealing tape and over a portion of a width thereof, and only one edge portion of the film strip is arranged inside the gap.

* * * * *